United States Patent [19]
Cocatre-Zilgien

[11] Patent Number: 6,012,675
[45] Date of Patent: Jan. 11, 2000

[54] AIRCRAFT SYSTEM MONITORING AIR HUMIDITY TO LOCATE UPDRAFTS

[76] Inventor: Jan Henri Cocatre-Zilgien, 617 W. Healey St., Champaign, Ill. 61820

[21] Appl. No.: 08/985,940

[22] Filed: Dec. 5, 1997

[51] Int. Cl.⁷ .............................. B64C 31/02; B64C 3/18; G05D 1/00
[52] U.S. Cl. .......................... 244/16; 244/76 R; 244/194
[58] Field of Search ........................... 244/1 R, 16, 76 R, 244/194, 195; 701/10; 73/182, 178 T, 170.28, 170.16

[56] References Cited

U.S. PATENT DOCUMENTS

| | | | |
|---|---|---|---|
| 3,498,108 | 3/1970 | Ruskin et al. | 73/29 |
| 3,798,971 | 3/1974 | Lowrance | 73/342 |
| 4,506,847 | 3/1985 | Norman | 244/1 R |
| 4,526,034 | 7/1985 | Campbell et al. | 73/336.5 |
| 4,591,111 | 5/1986 | Laughter | 244/75 R |
| 4,793,181 | 12/1988 | Djorup | 73/336.5 |
| 4,793,182 | 12/1988 | Djorup | 73/336.5 |
| 4,799,376 | 1/1989 | Siedlecki, Jr. et al. | 73/29 |
| 5,050,109 | 9/1991 | Ladd | 364/556 |
| 5,460,450 | 10/1995 | Buck | 374/20 |
| 5,668,542 | 9/1997 | Wright | 340/971 |
| 5,796,612 | 8/1998 | Palmer | 364/424.013 |

OTHER PUBLICATIONS

Carr J.J. (1982) 104 Weekend Electronics Projects. Blue Ridge Summit:Tab Books. pp. 42–47.

Crum TD et al. (1987) Coincident Lidar and aircraft observations of entrainment into themals and mixed layers. J. Clim. and Appl. Meteor. 26:774–788.

Figaro USA, Inc. (1997), Wilmette, IL 60091. Series 2000 Gas Sensors catalog.

King, Jr. WH (1965) The piexoelectric sorption hygrometer, in RE Ruskin (Ed.), Humidity and Moisture, vol. 1, Principles and methods of Measuring Humidity in Gases. New York: Reinhold. pp. 578–583.

Linx Technologies (1997), Medford, OR 97504. Ultra–compact Low–cost RF Data Modules data sheet.

Long D.D. (1969) Low–humidity test measurements. ISA Trans. 8:71–78.

Nowak, E (Oct. 1996) Moisture measurement with capacitive polymer humidity sensors. Sensors 13:(10)86–91.

Panametrics, Inc. (1997), Waltham, MA 02154. Minicap 2 RH Sensors catalog.

Reichmann H (1993) Cross–Country Soaring (7th Ed.) Hobbs, NM:Soaring Soc. of America. p.5.

Wilson AC et al. (Dec. 1995) A low–cost, high–spped, near–infrared hygrometer. Rev. Sci. Instrum. 66:(12)5618–5624.

*Primary Examiner*—Theresa M. Wesson

[57] ABSTRACT

An aircraft system intended for gliders and low power-to-weight aircraft, to aid the pilot in locating updrafts associated with the buoyancy of humid air in the convective layer of the atmosphere, namely moist thermals. The system comprises a pair of laterally spaced hygrometers, generally at the wingtips. Four types of hygrometer units are described; resistive, piezoelectric, spectrometric, and capacitive. Humidity data is transmitted to the cockpit by telemetry links, of which four types are also described; by dedicated wiring, by carrier current using wingtip position lights wiring, by modulated infrared beams, and by low-power radio waves. The system monitors the difference of humidity between left and right sensors, and also the rate of change of humidity of one or both sensors as a function of time. This lateral and eventually axial differential humidity information is presented to the pilot via a visual interface such as bargraph displays and computer monitors, or via an audio interface producing sounds of variable pitch or beat in one or more cockpit loudspeakers, or via both interfaces simultaneously. For humidity measurements inherently sensitive to temperature, such as relative humidity, either the hygrometers are heated, or their temperature is also measured so that temperature effects can be subsequently removed by computation. This system enables the pilot to get a better understanding of the thermodynamics of the convective layer of the atmosphere.

17 Claims, 10 Drawing Sheets

AIRCRAFT SYSTEM MONITORING AIR HUMIDITY TO LOCATE UPDRAFTS

FIELD OF THE INVENTION

This invention relates to aircraft systems, specifically to an external air humidity monitoring system for aiding in the location of updrafts and in steering light aircraft towards them.

BACKGROUND & PRIOR ART

It is common practice for pilots of gliders, sailplanes, motorgliders, ultralight airplanes and other relatively low power-to-weight aircraft to seek upward flows of air, and conversely, to avoid its downward flows. This reduces or simply eliminates reliance on an engine to stay aloft for long periods of time. In motorless aircraft, it allows climbing to great heights and it is the basis of the art of soaring.

One of the most common sources of upward flows are found in so-called thermals, when a bubble or a plume of air at a lower density than its surroundings creates an updraft by buoyancy. A glider pilot will navigate and execute search patterns to locate such a thermal, then find its fastest rising core and circle within it to climb, generally by using the visual or aural indications of an aircraft instrument called a variometer, which is an advanced form of Vertical Speed Indicator. The most difficult task, however, is not to circle within an identified thermal, but to find the rising air in the first place.

This task can be critical at low altitude, where the diameter of a thermal is often narrow, and where seeking the thermal in a wrong direction can then make an unwelcome off-airport landing imminent. Furthermore, a thermal is practically always surrounded by significant downdrafts of sinking air, which are undesirable areas to linger in while searching for the thermal itself. The problem is even more difficult when the thermal, sometimes called a "blue" or (inappropriately) "dry" thermal, is not capped by a telltale cumulus cloud to hint at its location. This is often the case early morning or late afternoon when thermals do not have enough energy to reach condensation altitude. Consistently finding thermals on a cloudless day is still a challenge for glider pilots, and few instruments can help in this task.

In searching for a thermal, a skillful glider pilot is constantly on the watch for a wingtip suddenly lifting more than the other, possibly indicating the presence of a thermal boundary, so as to immediately turn towards it. Instrumental detection of this increased lift of one wing by the use of strain gauges measuring the bending moment of the wings is the basis for U.S. Pat. No. 4,506,847 (Norman 1985). However, air at the boundary of a thermal is often turbulent, a source of false positives, and the device may not reveal more to the pilot than what can be observed visually or felt through the aircraft attitude and controls.

Another instrumental method for locating thermals is based on the observed fact that they often consist of air that is warmer, i.e. lighter, than the surroundings. The difference of temperature between wingtips can therefore give indication of where a thermal is relative to the trajectory of the glider. This principle is the basis for U.S. Pat. Nos. 3,798,971 (Lowrance, 1974) and 4,591,111 (Laughter, 1986). However, the generally accepted notion of a "thermal" being warmer than its surroundings is misleading. A bubble or a column of air warmer than its surroundings at ground level will cool by expansion while ascending, sometimes down to a temperature actually cooler than its surroundings, and yet pursue its upward motion by momentum. Abovesaid thermal detection devices based on temperature measurements would then steer the pilot away from the rising air, which is exactly the opposite of the objective of such devices.

It is somewhat less generally known that water vapor is about 62% lighter than dry air, and therefore that humid air will tend to rise by buoyancy in drier air just as warm air rises in cooler air around it. Helmut Reichmann (1993) says that "unusually high local humidity can cause such localized phenomena as thermals over swamps or even small lakes". The same author states that temperatures in such "moist thermals" are sometimes lower than those of the surrounding air. In this case, again, thermal detection only based on temperature measurements would not only miss the thermal, but lead the pilot away from it. Moist thermals are also nicknamed "wet thermals" although they do not contain water in liquid form, except within clouds. Moist thermals may be less powerful than "warm thermals" and consist in air rising slowly and relatively smoothly. As a result, they may not be easy to detect with the abovesaid methods based on wing strain.

Conceptually, the sun can first evaporate dew and surface water and initiate a moist thermal, yet maintain the ground relatively cool by evaporation, and second, the sun can heat the ground sufficiently to warm up the air above it and initiate a warm thermal. In some conditions, moist thermals may also be produced when a localized light rain evaporates, sometimes before reaching the ground. In this case the buoyancy provided by the resulting increase of atmospheric water vapor content can exceed the sink caused by evaporation cooling and by the downwards air entrainment caused by the remaining falling droplets. The fact is that there are very few comprehensive studies of the structure of thermals at the altitude, speed, and resolution of interest to glider pilots. Published observations are either too low and too static from ground towers, or too high and too fast from instrumented power planes.

Measuring the humidity of ambient air around an airplane is not new. Atmospheric moisture is one of the key elements in meteorological assessment and weather forecasting. Many air sounding aircraft are equipped with a combination of several types of sensors, such as Lyman-alpha hygrometers for absolute humidity, chilled-mirror thermoelectric hygrometers for dew-point, microwave resonance cavities for measuring microwave refracting index, hot-wire evaporators for cloud liquid-water content, among others. This information is collected for weather forecast purposes, and is not used for the management of the flight itself. Humidity of ambient air is also important in the evaluation of the risk of aircraft icing when flying in clouds, or for some humidity sensitive military payloads (U.S. Pat. No. 5,050,109). In this case an alarming humidity reading may prompt the crew to fly at a different altitude to avoid icing. These methods generally provide an actual humidity reading that is as accurate as possible.

Humidity is a variable which is inherently more difficult to measure than temperature. Not only is there a very wide variety of humidity measuring devices, but there are many ways of expressing humidity itself, such as mixing or mass ratio, specific humidity, absolute humidity, volume ratio, partial pressure, dew point, relative humidity, etc. Humidity air soundings showing evidence of moist thermals are generally expressed in terms of specific humidity (g of vapor per kg of vapor and dry air mix) or in terms of the numerically quite close mixing ratio (g of vapor per kg of dry air). The majority of common humidity sensors provides an output in terms of relative humidity (RH), which is the ratio between actual water vapor partial pressure and saturation water vapor pressure at the same temperature. Relative humidity depends heavily on temperature by definition.

Calculations show that by using plain relative humidity sensors to detect thermals, the pilot of a glider would be unable to ascertain if a change of RH was due to an actual change of humidity (RH increase in moist thermal), a change of temperature (RH decrease in warm thermal), or whatever combination of the two. To subtract the effect of temperature on RH, the common practice is either to artificially heat the sensor, which may also accelerate chemical reactions in some sensors (Figaro 1997), or to collect temperature information alongside RH so that the actual water vapor pressure and derived units can be mathematically computed (Nowak 1996).

OBJECTS AND ADVANTAGES

It is the general object of the invention to provide a novel aircraft system to help a pilot locate updrafts, which avoids the disadvantages of prior thermal detection systems while affording additional design and operational advantages.

A major advantage of the aircraft system of the present invention is that it detects "moist thermals", that the prior art aiming at detecting "warm thermals" would not only fail to identify as possible areas of lift, but in some cases actually lead the pilot away from.

The advantage of moist thermal detection is enhanced by the fact that the humidity changes at the boundaries of an updraft are often more abrupt, thus easier to detect, than variations of temperature of same significance. In some instances, such changes adopt a caricatural "top-hat" profile (Crum et al. 1987) Another advantage of the system of the present invention is that the strong influence of temperature on some humidity measurements, such as relative humidity, is subtracted. The system therefore detects moist thermals practically independently of air temperature variations, and therefore of the warm thermal detection of the prior art.

A significant advantage of the system of the present invention is that it does not rely on accurate humidity measurements, but only on its variations. It measures only the difference between two humidity values either in space, in time, or both, so as to analyze trends, and has no immediate concern with the actual value of humidity itself. This greatly simplifies the design and the cost of the instrumentation as well as its calibration.

A supplemental advantage of the system of the present invention is that most of its embodiments (and the wireless implementations in particular) require little or no permanent alterations of the aircraft on which they are installed. The increase of parasitic drag it creates is generally less than that of position lights. Furthermore, the instrumentation is generally easy to remove for maintenance or for transfer from one aircraft to another, that is, the system is easily portable.

A safety advantage of most of the embodiments of the present invention is that information about the humidity environment is provided aurally to the pilot, allowing for only an occasional glance at visual instrumentation, and focusing instead outside of the cockpit. The quietness of the cockpit in motorless aircraft allows simultaneous operation of several channels of audio information.

In complement to temperature monitoring systems (U.S. Pat. Nos. 3,798,971 and 4,591,111), the pilot can sort volumes of air into 4 categories: the warmer & dryer, the warmer & moister, the cooler & dryer, and the cooler & moister, as well as their evolution from one category into another with time, altitude, and their lifting or sinking tendencies. The system of the present invention therefore enhances the perception of air for parameters that are not directly observable by the pilot. It helps the pilot to get a better situational awareness of rising and sinking air, and to get a better understanding of the thermodynamics of thermals, plumes, columns, and bubbles. Because the small-scale dynamic structure of clear unstable air is still mysterious in many respects, an object of the system of the present invention is to contribute to the transformation of the art of soaring into a science of soaring.

Further objects and advantages of the invention will become apparent from a consideration of the drawings and ensuing description.

SUMMARY

The aircraft system of the invention described hereinafter comprises the following functionally linked elements: a left humidity sensor, a right humidity sensor, spanwise humidity data telemetry links towards some medial location, and finally, a pilot interface in the cockpit. This system is to be installed primarily in low power-to-weight or motorless aircraft such as gliders, generally flying slowly, clear of clouds, in the convective layer of the atmosphere. The purpose of this system is the detection of so-called moist thermals, that is humid air moving upwards by buoyancy, so that the pilot can steer the aircraft into them and use them to climb. There is a wide variety of methods for measuring humidity, even at the relatively low levels that can be found in flight (Long 1965). Accordingly, four different embodiments of the same system are described, each based on one of the major types of humidity sensors, namely resistive, piezoelectric, spectrometric, and capacitive. The four embodiments of the system also use different telemetry methods, by wire, infrared beam, or radio waves, and different analog or digital types of pilot interfaces.

DESCRIPTION AND OPERATION OF THE 1$^{st}$ EMBODIMENT

Four main embodiments of the invention will be described to show the different types of hygrometers, telemetry links, and pilot interfaces that can be installed on an aircraft 20 (on aircraft 20A, 20B, 20C, and 20D). In all four embodiments described herein, an 'L' suffix to a 'Left' part number always implies the existence of a 'Right' part, with an 'R' suffix, located generally symmetrically about the sagittal plane of aircraft 20. If self-explanatory and unambiguous, such 'R' parts are not always represented in the drawings or in the text, to improve clarity.

The 1$^{st}$ embodiment of the invention is based on sensors that change electrical resistance (or impedance) as a function of humidity, with humidity information being transmitted to the cockpit along dedicated electrical wires.

Figure 1A:
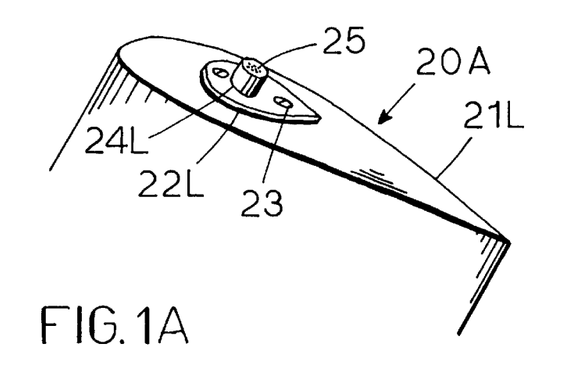
FIG. 1A–1D Perspective view of an aircraft left wingtip equipped with; (A) a resistive, (B) a piezoelectric, (C) a spectrometric, or (D) a capacitive, humidity sensor.
Figure 2:
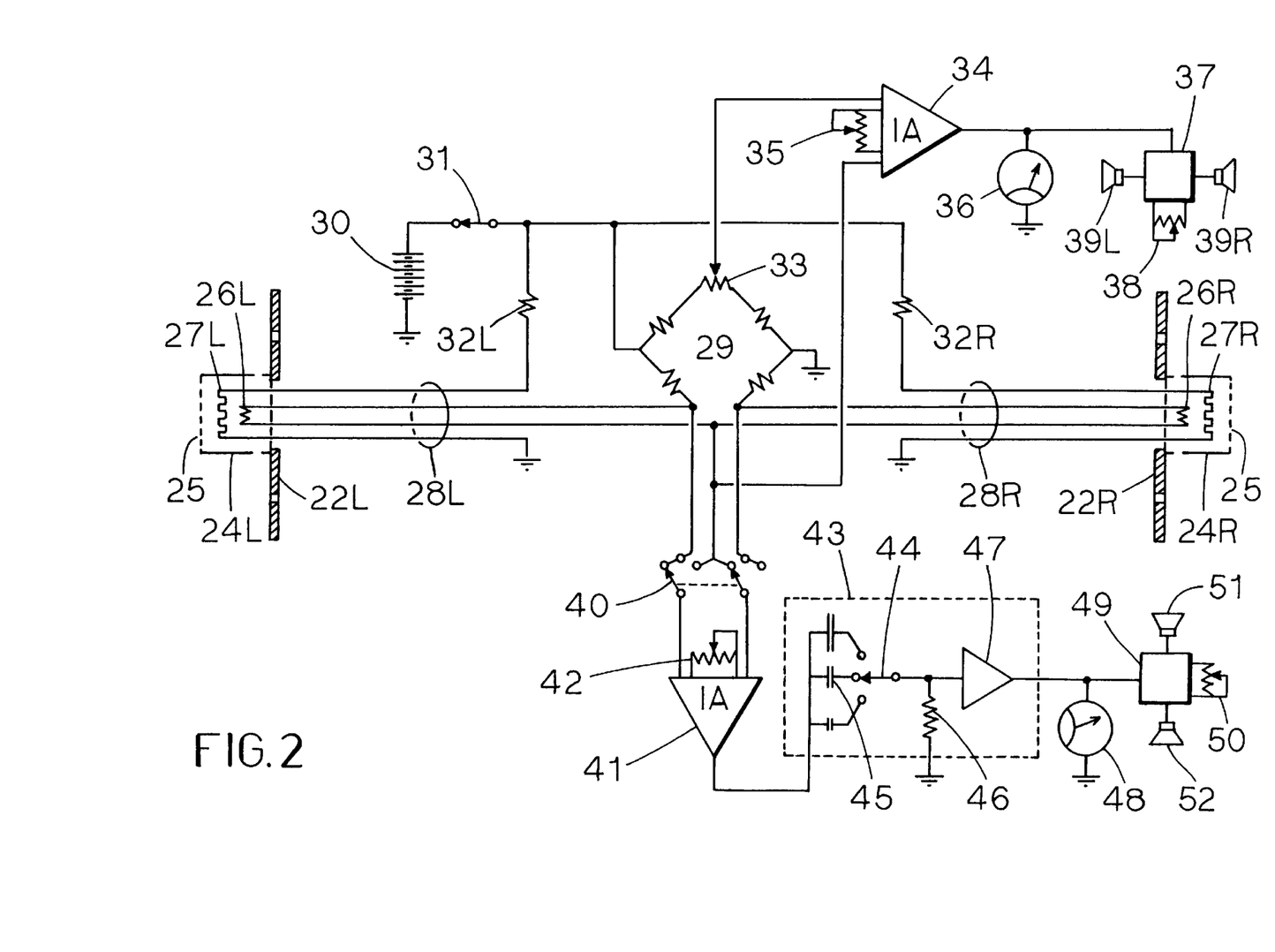
FIG. 2 Electrical diagram of a DC-excited resistive humidity sensor system with resistive sensor heaters.

Referring to FIG. 1A, a generally flat and teardrop-shaped solid support 22L is affixed by screws 23 to the tip of a left wing 21L of an aircraft 20A such as a glider. A sensor casing 24L is securely affixed to support 22L and is opened to ambient air via casing holes 25 so that some atmospheric air can circulate within it during flight of aircraft 20A. Referring to FIG. 2, sensor casing 24L contains a sensor element 26L whose resistance varies as a function of humidity, and which is in close proximity to a resistive heating element 27L. Sensor and heater elements 26L and 27L are commercially available together on the same substrate, for example from Figaro USA (1997). Parts 22R to 27R (some shown in FIG. 2) are installed symmetrically on a right wing 21R of aircraft 20A.

Referring to FIG. 2, dedicated electrical multiconductor wiring 28L and 28R is installed within wings 21L and 21R to connect wingtip sensors 26L and 26R to a Wheatstone bridge 29 in a generally central location of aircraft 20A. Bridge 29 is excited by a source of DC voltage, such as from a battery 30, which may be the aircraft battery, via an "on/off" switch 31. Resistor values of bridge 29 are chosen so as to not allow the current in sensors 26L and 26R to exceed the rating specified by the sensor manufacturer. Dedicated wiring 28L and 28R also electrically connects wingtip sensor heaters 27L and 27R to battery 30, through current-limiting resistors 32L and 32R, as per manufacturer specifications. Also, appropriate batteries and voltage regulators (not shown) provide the positive and negative voltages relative to ground for the electronic components, described below, that require them.

Referring to the upper area of FIG. 2, a "lateral balance" potentiometer 33 is placed in bridge 29 to electrically balance the bridge. The bridge output is fed to a high-impedance Instrumentation Amplifier (IA) 34, such as a AD620A, with gain controllable by a "lateral sensitivity" potentiometer 35. As shown, the voltage output of amplifier 34 is a function of the difference of humidity between the two wingtips, warranting the term "lateral" in the present description. The positive, null, or negative output of amplifier 34 is fed to two different pilot interfaces, first, to a lateral visual interface 36, represented simply in FIG. 2 as a zero-center analog needle meter, second, to a lateral audio interface 37, represented simply in FIG. 2 as an enclosure with a "lateral threshold" potentiometer 38 and two loudspeakers 39L and 39R. Both these lateral interfaces will be described in detail below.

Referring now to the lower area of FIG. 2, a two-pole three-position switch 40 labeled "axial source" allows a second high-impedance Instrumentation Amplifier 41, such as a AD620A, to monitor the voltage drop caused by the left sensor 26L when toggled to the left (as in FIG. 2), the right sensor 26R when toggled to the right, or both sensors in series when toggled to the center. In the center position, amplifier 41 processes a form of humidity average if left and right sensors are a matched pair in terms of their humidity response. The gain of amplifier 41 is controllable by an "axial sensitivity" potentiometer 42. All switches and potentiometers described herein are installed in some ergonomic control box (not shown) reachable by the pilot in flight, for example on one of the sides of the cockpit, as the space available in the forward instrument panel of a glider is generally limited.

Instead of directly communicating the output of amplifier 41 representative of current humidity to the pilot, it is differentiated with respect to time in a differentiator 43. As shown, the output of differentiator 43 is a function of the difference of humidity between present and past, that is between present and past location on the flight trajectory of aircraft 20A, warranting the term "axial" in the present description. Differentiator 43 is for example an amplified and buffered RC circuit, as described in detail in Carr (1982). It comprises an "axial time constant" rotactor switch 44 to select a capacitor 45 from an array of different capacitors, a resistor 46, and a buffer 47 with provision for offset adjustment. The positive, null, or negative output of differentiator 43, which is self-zeroing as a function of a time constant determined by capacitor 45 and resistor 46, is fed to two different pilot interfaces, first, to an axial visual interface 48, represented simply in FIG. 2 as a zero-center analog needle meter, second, to an axial audio interface 49, represented in FIG. 2 as an enclosure with an "axial threshold" potentiometer 50, a front loudspeaker 51, and a rear loudspeaker 52. Both axial interfaces 48 and 49 and the lateral interfaces 36 and 37 mentioned above, will be detailed in the next paragraphs.

Figure 3:
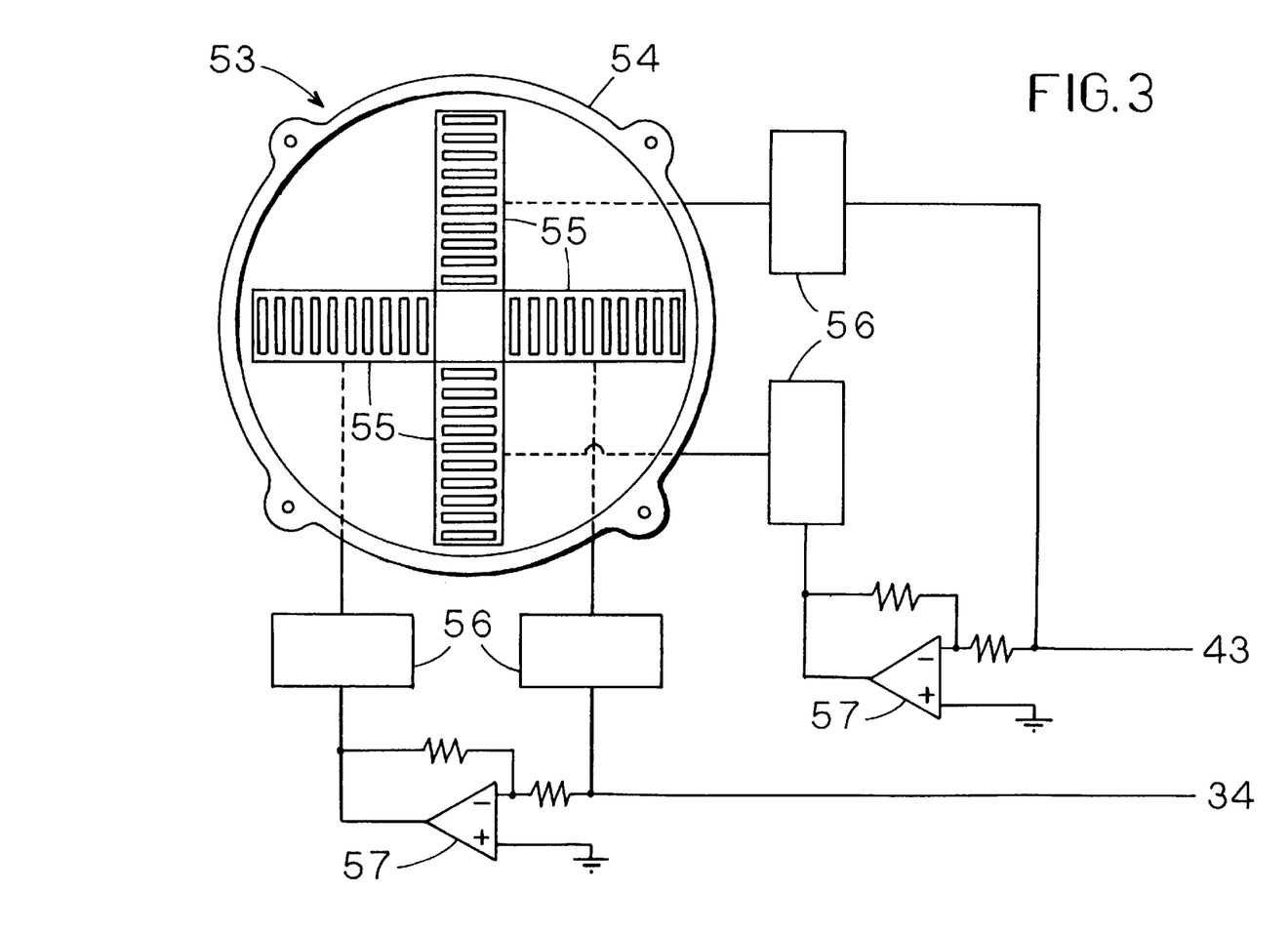
FIG. 3 Front view of a Differential Humidity Indicator and associated electronics diagram.

Referring to FIG. 3, a "Differential Humidity Indicator" (DHI) 53 combines into a single aircraft instrument both the lateral 36 and the axial 48 visual pilot interfaces, for differential humidity information. Indicator 53 comprises a frame 54 to be installed in a cockpit avionics panel in view of the pilot, and a cruciform array of Light Emitting Diode (LED) bargraph displays 55 as shown. Within the same DHI 53, the horizontal LED bargraphs display lateral humidity information, and the vertical ones display axial humidity information. Each LED bargraph is controlled by a dot/bar display driver 56, for example a logarithmic LM3915. By convention, positive outputs from lateral amplifier 34 and axial differentiator 43 control the "RIGHT" and the "FRONT" displays, and negative outputs, after having been inverted by operational amplifiers 57, control the "LEFT" and the "REAR" ones, respectively, thereby creating two intersecting Precision Null Meters (digital versions of needle meters 36 and 48 of FIG. 2). Complete schematics for such null meters can be found for example in technical literature TL/H/5104-28 published by the National Semiconductor Corporation for their LM3915 integrated circuits.

Figure 4:
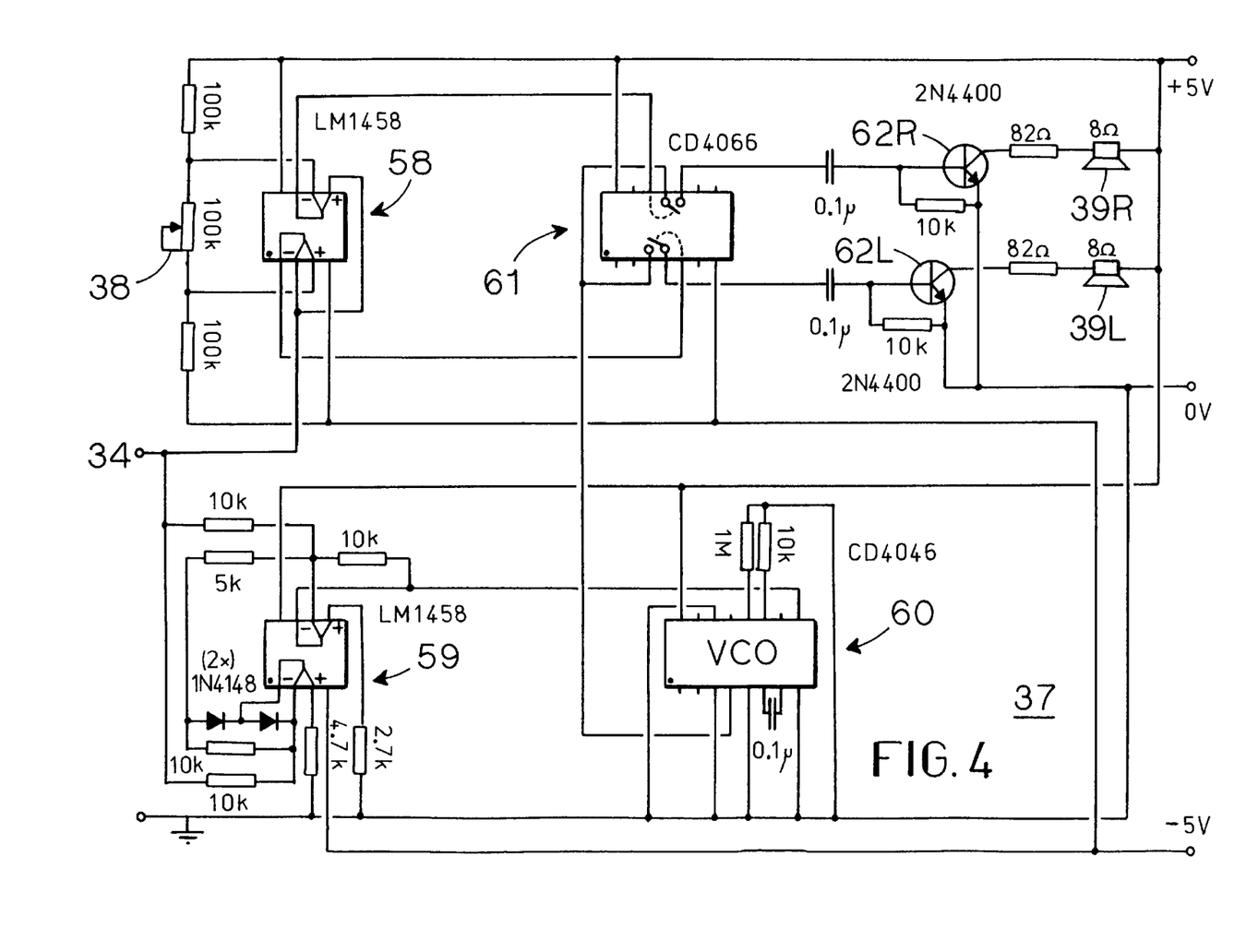
FIG. 4 Detailed electronic schematics of the lateral audio interface of the resistive sensor embodiment.

The electronic schematics of lateral audio interface 37 are now detailed in FIG. 4. A window discriminator 58 uses two operational amplifiers from a LM1458N integrated circuit as a pair of voltage comparators, as shown. "Lateral threshold" potentiometer 38 controls the difference between positive and negative thresholds, the latter having the same absolute value as that of the positive one. Discriminator 58 detects if the positive or negative voltage produced by differential amplifier 34 is higher than the positive threshold or lower than the negative threshold. The output of amplifier 34 is also fed to a typical precision full-wave rectifier 59, also based on a LM1458N dual op-amp. The always-positive output of rectifier 59 is then fed to a Voltage Controlled Oscillator (VCO) 60, based on a CD4046 Phase Locked Loop, to produce an audio frequency that increases in pitch with the amplitude of the voltage. The output of oscillator 60 is routed through an electronic switch array 61, here a CD4066, which is under control of the outputs of discriminator 58, towards transistor amplifiers 62L and 62R, and finally, to loudspeakers 39L and 39R. Loudspeakers 39L and 39R are positioned in the cockpit on the left and on the right of the pilot, respectively.

As a result of lateral audio interface 37, if a positive voltage from amplifier 34 (here higher humidity to the right, by convention) exceeds the positive threshold set by potentiometer 38, it will produce in right loudspeaker 39R a sound with a frequency in some proportion to the intensity of the humidity difference between right and left wingtips. Conversely, a negative voltage lower than the negative threshold will produce the sound in left loudspeaker 39L. If the voltage is between the two thresholds, no sound is produced in either loudspeaker.

Axial audio interface 49 (FIG. 2) is identical to the lateral audio interface 37 just described except for the following. Its input is differentiator 43 instead of amplifier 34, its threshold adjustment is "axial threshold" potentiometer 50 instead of 38, front loudspeaker 51 replaces 39R, and rear loudspeaker 52 replaces 39L. Front loudspeaker 51 is located in the vicinity of the front instrument panel, and rear loudspeaker 52 aft of the head of the pilot, for example on the rear cockpit wall. If the "axial source" selected by switch 40 travels from a zone of lower to higher humidity, a sound will be produced in front loudspeaker 51 with a frequency in some proportion of its rate of change. Conversely, if aircraft 20A leaves a high-humidity area or enters a low-humidity one, the sound will be produced in rear loudspeaker 52.

The heated humidity sensors of this $1^{st}$ embodiment provide an output which is here a function of absolute humidity (Figaro USA 1997), and not relative humidity. It can be shown that for an aircraft flying in search of moist thermals, using variations of absolute humidity is practically the same as using variations of mixing ratio. In particular, a drop of absolute humidity caused by a rise of temperature of +1° C. (typically encountered in a warm thermal) is negligible in front of its increase caused by a rise of mixing ratio of +1 g/kg (typically encountered in a moist thermal). In those circumstances, the system described essentially detects changes of moisture of the atmosphere, not changes of temperature.

Operation of the audio-visual humidity monitoring system of the first embodiment is best explained by the example of a glider in search of moist thermals, as follows. The right wingtip grazes a zone of humidity which is high enough relative to that at the left wingtip to exceed the positive threshold set by "lateral threshold" potentiometer 38. This triggers a sound in the right loudspeaker at a frequency in some proportion of the humidity differential between right and left wingtips. Upon hearing this, the pilot only needs to glance at DHI 53 to gauge or confirm the strength of this differential by the distance the illuminated dot has moved to the right, and to decide or not to turn the glider towards the right. Once within a moist thermal with a generally Gaussian humidity profile and circling in it clockwise, if the pilot increases the rate of the turn in some proportion to the frequency of the sound from the right loudspeaker, the glider will tend to center that thermal. From there on standard indications from the variometer instrumentation of the glider can also be used to find the strongest lift. For those cases where the glider encounters moist thermals practically head on, the front loudspeaker warns the pilot, who would have to decide if to turn, based on the frequency of the sound and the upwards excursion of the axial dot on DHI 53. The pilot would then decide on which side to turn by checking on the same indicator 53 if a sub-threshold asymmetry appeared on the lateral bargraphs, and turn the glider accordingly "towards the dot".

Psychophysics teaches us that horizontal spatial resolution of human hearing can reach 1°, so there is no ambiguity for the pilot as to which of the various aircraft loudspeakers (not only the humidity audio interfaces described, but also audio variometer, communications radio, and others) produce sounds, especially in a quiet motorless glider. The "humidity sounds" produced by one of the lateral and/or one of the axial loudspeakers point naturally to the bearings of the zones of highest humidity, so that the pilot can elect to turn "towards the sound" to reach them. With experience, the pilot does not need to scan the instruments and can rely solely on the audio interfaces to concentrate on the safe conduct of the flight, especially at a low altitude or if other gliders are also seeking lift in the vicinity.

DESCRIPTION AND OPERATION OF THE $2^{nd}$ EMBODIMENT

The $2^{nd}$ embodiment of the invention is based on gravimetric sensors, in the form of piezoelectric sorption hygrometers (King 1965), with humidity information being carried along pre-existing DC wiring used to power position lights.

Figure 5:
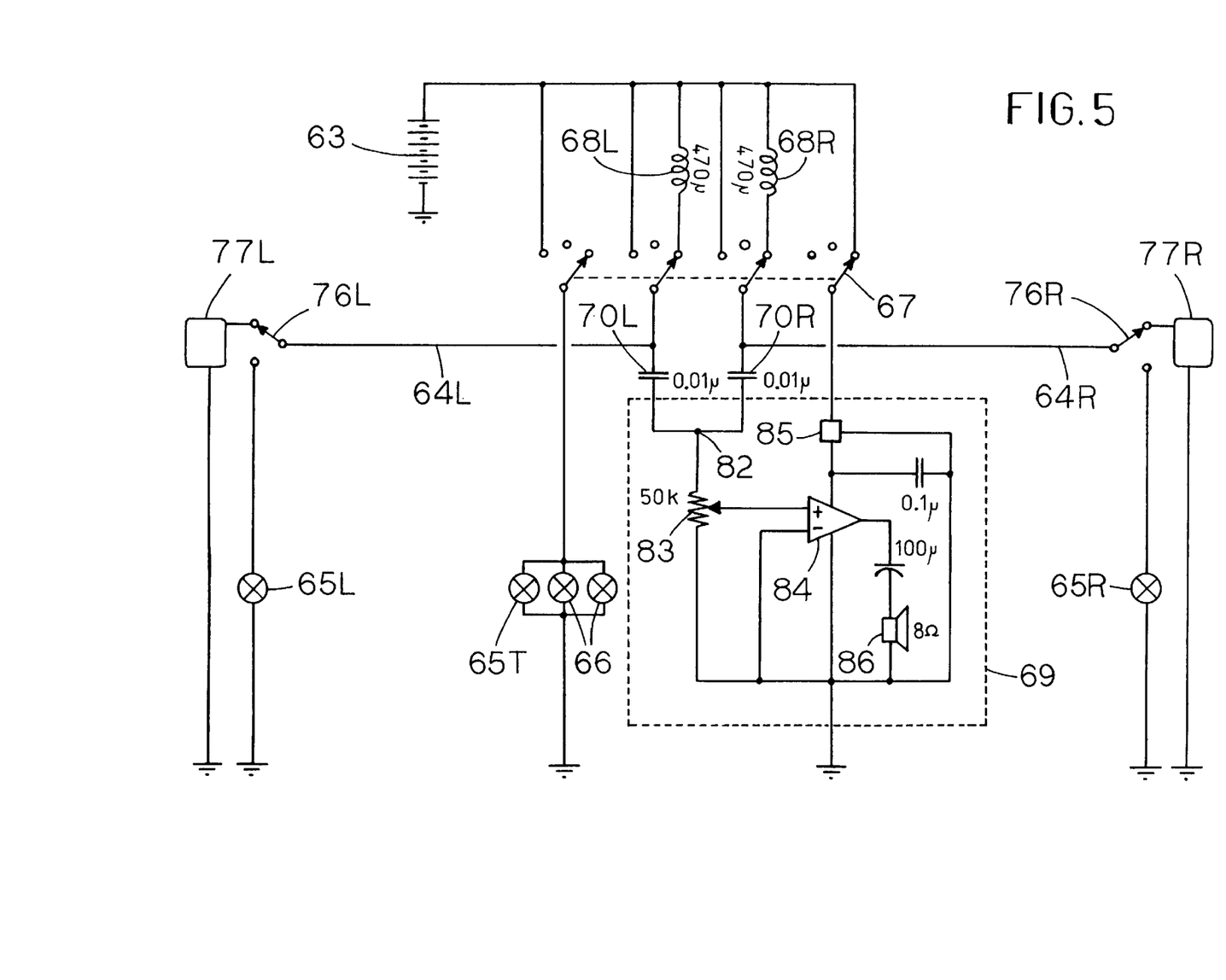
FIG. 5 Overall electrical diagram of the piezoelectric sensor embodiment and its audio interface.

Referring to FIG. 5, a typical wiring for the position lights of a light aircraft 20B such as a motorglider approved for night flying comprises a 12 or 14 Volt aircraft battery 63, a left supply wire 64L within left wing 21L, a red left wingtip position light 65L, a right supply wire 64R within right wing 21R, a green right wingtip light 65R, a white tail position light 65T, and other lights 66 normally turned on together with position lights. Return current can either be drained to the airframe structure in a conductive metal aircraft, as shown, or to some dedicated wiring in a wooden or composite aircraft.

For the purpose of the $2^{nd}$ embodiment of the invention, the abovesaid typical wiring is modified by the installation of a 3-position 4-pole switch 67 within reach of the pilot in the cockpit. Referring to FIG. 5, on a left "position lights" position, all lights 65L, 65R, 65T, and 66 are powered in a standard way. On a center "off" position, battery 63 is totally isolated from the circuitry shown. On a right "humidity" position (as shown in FIG. 5), switch 67 routes battery electricity towards wires 64L and 64R through high-current radiofrequency choke coils 68L and 68R, and to an audio beat interface 69, which will be described in detail below. Furthermore, two capacitors 70L and 70R are installed between wires 64L and 64R and interface 69.

Figure 1B:
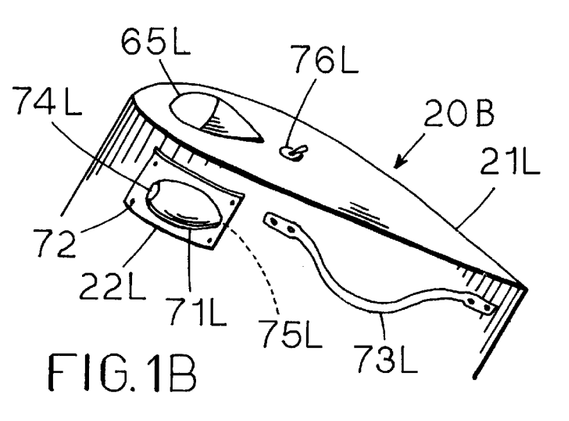

Referring back to FIG. 1B, an elongated and aerodynamically shaped canister 71L is securely affixed to support 22L, held flush by rivets 72 under the tip of left wing 21L of aircraft 20B, said above to be a motorglider. Canister 71L is positioned so as to not interfere with the field of illumination of position light 65L. In the case illustrated in FIG. 1B, canister 71L is positioned in front of an attachment point of a wingtip skid 73L, so that it has ground clearance when this skid touches the ground. Canister 71L is opened to ambient air by an inlet 74L generally facing forward and an outlet 75L generally facing rearwards so that some ram air can circulate within it in accordance with King (1965) during forward motion of aircraft 20B. A symmetrical installation is completed on the right side with parts 71R to 75R (not shown). Referring to both FIG. 1B and FIG. 5, the electrical system of aircraft 20B is further modified by the installation of toggle switches 76L and 76R in the vicinity of position lights 65L and 65R so as to be easy to see and to operate during the preflight check of the aircraft. Switches 76L and 76R route electrical power from wires 64L and 64R either to position lights 65L and 65R, or to wingtip oscillators 77L and 77R, as shown.

Figure 6:
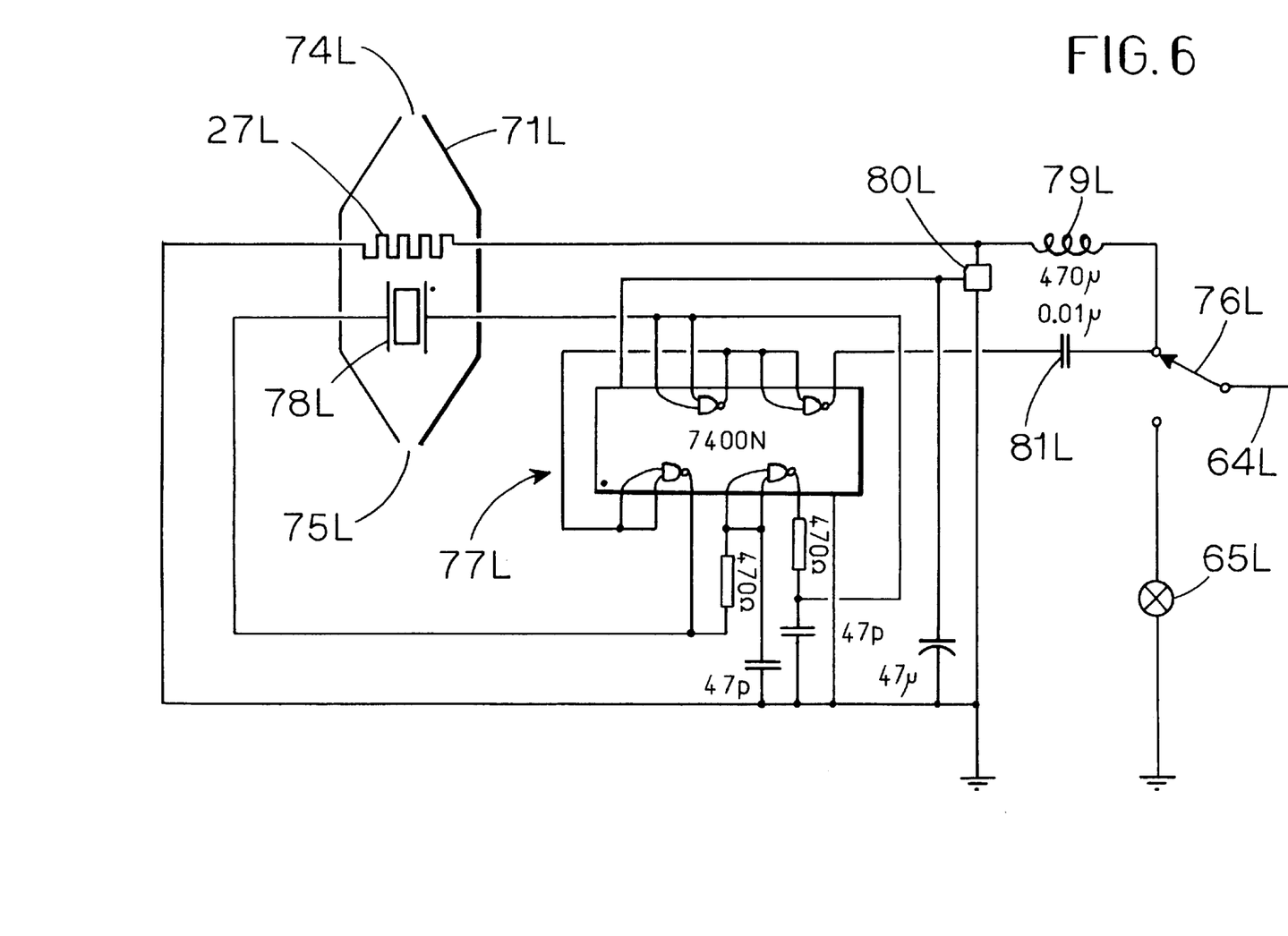
FIG. 6 Schematics of a left wingtip oscillator of the piezoelectric sensor embodiment.

Referring to FIG. 6, wingtip oscillator 77L is a radiofrequency (4 MHz) crystal-controlled oscillator, here based on TTL gates (7400N), where a piezoelectric crystal 78L is coated with an hygrophilic substance and positioned within canister 71L. Crystal 78L is in close proximity to a resistive heating element 27L so as to create a so-called crystal oven, within the sampling of ambient air flowing through the canister (King 1965). With switch 76L in the position shown, oscillator 77L is powered by the aircraft DC voltage from wire 64L through a high-current radiofrequency choke coil 79L and a 5 Volt voltage regulator 80L (7805). The radiofrequency output of the oscillator is fed through a capacitor 81L back to wire 64L. A tap between choke 79L and regulator 80L is a source of power for heater element 27L. As wingtip oscillator 77L comprises few and small components, as shown, they can be included within canister 71L, and that canister can can still be made to be the same order of size as a position light. With switch 76L toggled, oscillator and heater are unpowered and position light 65L is put back in circuit. An identical oscillator arrangement comprising parts 71R to 81R is made on the right side (not shown), but crystal 78R is chosen so that its fundamental frequency differs from that of 78L by a value from several tens to several hundred Hertz, in the audiofrequency range.

Referring back to audio interface 69 in FIG. 5, outputs from capacitors 70L and 70R are brought to a common node 82. Instantaneous voltage at node 82 is the algebraic sum of the two radiofrequencies from the wingtips, and it shows therefore a typical beat at a frequency equal to their difference. Voltage of node 82 is fed through a "volume" potentiometer 83 to an amplifier 84. This amplifier is powered through a voltage regulator 85 (7812) and its output is a loudspeaker 86 located in the cockpit. Amplifier 84 is optimized for an audiofrequency bandwidth (such as the LM386) and acts as a low-pass filter. As a result, only the envelope of the beat is audible in loudspeaker 86, that is the difference of frequency of the two wingtip oscillators 77L and 77R. Psychophysics teach us that humans can discriminate changes of 1 Hz even at 1000 Hz. According to King (1965), this in turn corresponds to the ability to detect a difference of water vapor concentration of less than one part per million (ppm). For reference, boundaries of moist thermals are much larger, of the order of 1000 ppm (1 g/kg mixing ratio). As audio interface 69 comprises very few and small elements, its enclosure can be made barely bigger than loudspeaker 86 itself.

Operation of the $2^{nd}$ embodiment of the invention is as follows. Prior to take-off in anticipation of thermal seeking (daytime), the pilot connects left and right wingtip oscillators 77L and 77R to their respective position light wires 64L and 64R with switches 76L and 76R. In flight, the pilot activates switch 67 to the right (FIG. 5) to power the wingtip oscillators and their heaters, and audio interface 69. The pilot listens to the sound produced by the audio interface, set at a high or low volume depending on the cockpit noise level (motorglider engine running or not), and assesses its changes of frequency. A raising of the pitch of the sound indicates that, for example, the left wingtip is exposed to more humidity than the right one, and a lowering of the pitch that the right wingtip is exposed to more humidity than the left one (or vice-versa if the crystals are swapped). The fast response of crystal hygrometers, combined with maneuvering of the aircraft, provides the pilot with a good picture of the location of the high humidity areas, as described in the operation of the $1^{st}$ embodiment above. Prior to a night flight, the normal operation of the position lights is resumed by toggling wingtip switches 76L and 76R towards lights 65L and 65R, and by toggling cockpit switch 67 to the left (FIG. 5).

DESCRIPTION AND OPERATION OF $3^{rd}$ EMBODIMENT

The $3^{rd}$ embodiment of the invention is based on sensors that measure the absorption of electromagnetic energy by water vapor, with humidity information being transmitted to the cockpit by modulated infrared light.

Figure 1C:
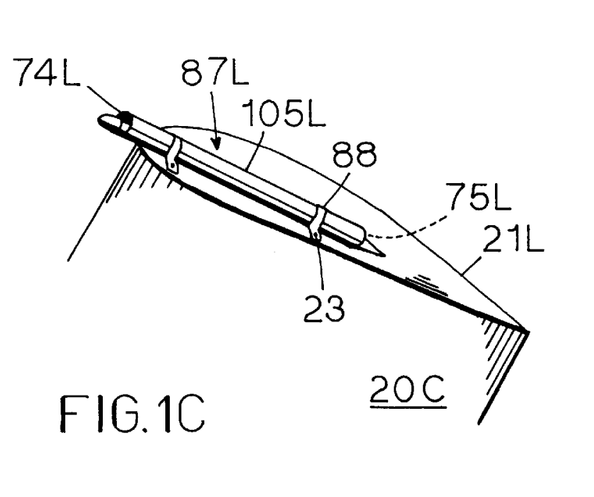

Referring to FIG. 1C, a spectrometric hygrometer and infrared (IR) transmitter wingtip unit 87L presents itself as an elongated and generally tubular structure. Unit 87L is attached to the tip of left wing 21L of aircraft 20C by brackets 88 and screws 23, so that its longitudinal axis is generally parallel to the normal flight trajectory of aircraft 20C.

Figure 7A:
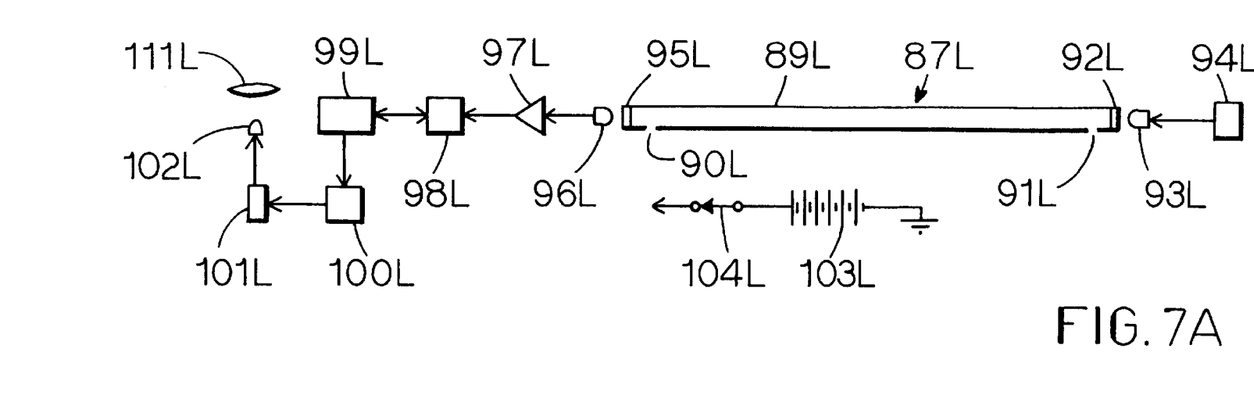
FIG. 7A and 7B Left IR wingtip unit of the spectrometric sensor embodiment; (A) synoptic view, (B) horizontal section.

Referring now to FIG. 7A, wingtip IR unit 87L comprises a number of functional elements. A rectilinear, rigid, and relatively narrow tube 89L, with walls opaque to visible and infrared light, acts as the active optical duct of unit 87L. Tube 89L is opened laterally to ambient air by a front hole 90L and by a rear hole 91L. The rear lumen of tube 89L is hermetically closed by a window 92L transparent to infrared radiation. An InGaAsP infrared emitting diode (IRED) 93L producing significant output around 1380 nm (Wilson 1995) is positioned behind window 92L and aims forward into tube 89L. The voltage applied to IRED 93L is maintained constant by a high precision voltage regulator 94L so as to maintain its infrared output independent of power supply variations. The front lumen of tube 89L is hermetically closed by a bandpass filter 95L centered on 1380 nm (Wilson 1995), which is one of the strong absorption bands for water. A germanium photodiode 96L is positioned in front of filter 95L and aims backwards into tube 89L, towards IRED 93L.

Still referring to FIG. 7A, the current through photodiode 96L, which is a function of the relatively constant intensity of IRED 93L and of the variable number of water molecules present within duct 89L, is converted to a voltage in a current-to-voltage (I/V) converter 97L, similar to those found in precision photographic lightmeters. The voltage produced by amplifier 97L is digitized several tens of times per second in an analog-to-digital (A/D) converter 98L, under the management of a simple microcontroller 99L, into a binary number, representative of humidity. As even large humidity variations cause the output of I/V converter 97L to vary only by a fraction of a percent, expanded-scale circuitry can be used to maximize the digital resolution if A/D converter 98L does not have built-in provision to do so. Microcontroller 99L gates the output of an oscillator 100L, running at a fixed frequency of about 40 kHz, into a pattern of bursts encoding the binary number created by A/D converter 98L. Such encoding is commonly used in television remote controls and consists of a long synchronization burst, followed by as many short bursts as there are bits in the humidity binary number, all separated by short intervals. The burst pattern is updated at the same rate as the digitization performed by A/D converter 98L and is fed via a high-current switching device such as a power MOSFET 101L to a high-output narrow-beam near-infrared emitting diode 102L radiating in the range of 880 to 940 nm (called here NIRED to avoid confusion with IRED 93L). Finally, a battery 103L with an on-off switch 104L provides appropriate electrical power (not shown) to all the electronics described above.

Figure 7B:
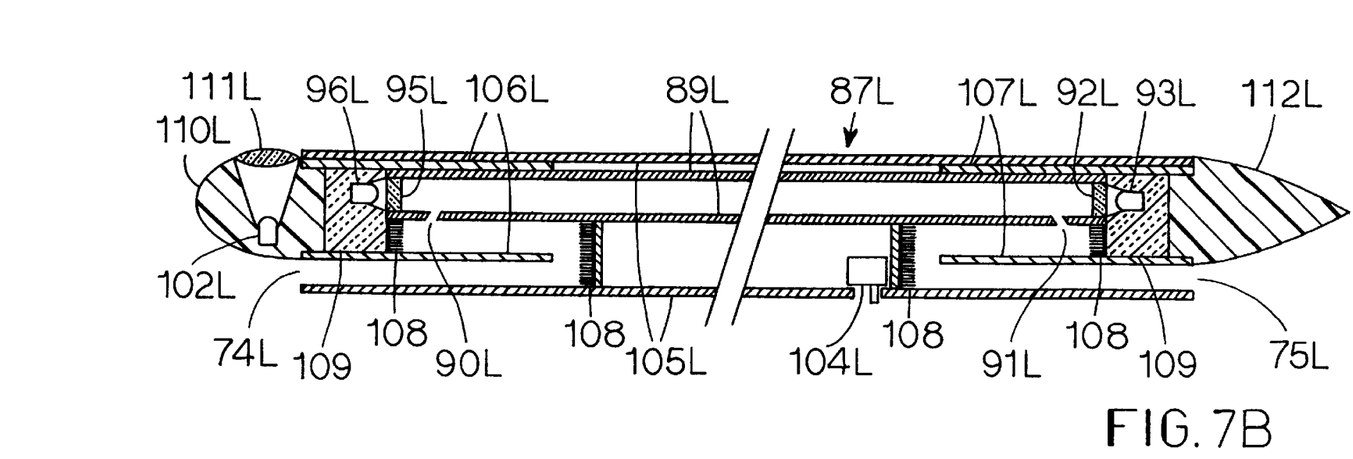

If FIG. 1C was showing a perspective view of wingtip unit 87L, and FIG. 7A was showing its functional elements, FIG. 7B now shows a longitudinal cross-section of its front and rear parts. As the middle part has a constant cross-section, it is not represented at full length in the central part (slashes) of FIG. 7B. Unit 87L comprises not only narrow tube 89L, but a slightly longer rigid and rectilinear wide tube 105L, which acts as a backbone for the whole unit. A short length of a front intermediate tube 106L and a short length of a rear intermediate tube 107L are placed between narrow 89L and wide 105L tubes as shown. Tubes 89L, 105L, 106L and 107L are secured together along a common generatrix of their respective walls, that is in a parallel non-concentric fashion, as shown. The tube walls are coated by a mat black non-reflective finish such as found in the inside of telescopes. Open space between narrow and intermediate tubes and between narrow and wide tubes is closed as shown by a velvety light-absorbing material 108, to create zig-zag ducts. Also, front and rear holes 90L and 91L are slanted through the wall of narrow tube 89L, as shown. As a consequence of the above, light entering through air inlet 74L or air outlet 75L will be trapped and not reach the inside of narrow tube 89L in any significant amount. However, ram air entering through air inlet 74L during forward flight of aircraft 20C will flow along a first zig-zag, enter narrow tube 89L through front hole 90L, flow down the length of narrow tube 89L, absorb in it some infrared radiation from IRED 93L, leave it through rear hole 91L, flow along another zig-zag, and finally leave unit 87L through air outlet 75L.

Referring to the left part of FIG. 7B, photodiode 96L at the front end of narrow tube 89L is embedded in thermal insulation material 109, to slow down externally induced temperature variations. A removable aerodynamically shaped nose 110L plugs into the front extremity of front intermediate tube 106L, and can be manually positioned at any angle about the axis of tube 106L. As shown, NIRED 102L is positioned in nose 110L at the near-infrared focal point of a convex lens 111L secured at the surface of the nose, so that its infrared beam points slightly less than 90° away from the nose axis, that is generally aiming at the cockpit of aircraft 20C. Referring to the right part of FIG. 7B, IRED 93L at the rear end of narrow tube 89L is also embedded in some thermal insulation 109. A tailcone 112L plugs the aft extremity of rear intermediate tube 107L as shown. Electronics parts 94L, 97L to 101L, and battery 103L are located in the clear space available between narrow tube 89L and wide tube 105L, behind external access panels (not shown). Switch 104L is installed nearly flush with the external surface of wide tube 105L.

Figure 8A:
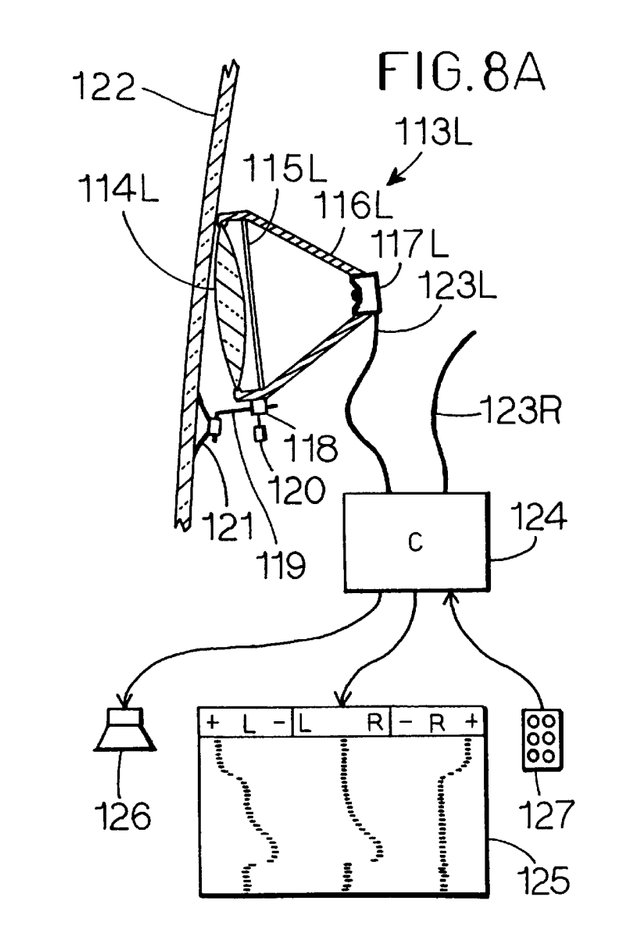
FIG. 8A and 8B Left IR cockpit unit of the spectrometric sensor embodiment; (A) cross-section, with synoptic view of audio-visual interface, (B) perspective view.

Referring to FIG. 8A, a cockpit IR unit 113L comprises a convex lens 114L and a filter 115L transparent to the near-infrared and generally opaque to visible light, secured at the large end of an opaque conical tube 116L, as shown. At the small end of conical tube 116L and at the near-infrared focal point of lens 114L is secured an infrared detector module 117L. This module is of the type found at the front of IR remote-controlled televisions, and generally contains in a single compact unit: photodiode, amplifier, limiter, bandpass filter, demodulator, integrator, and comparator.

Figure 8B:
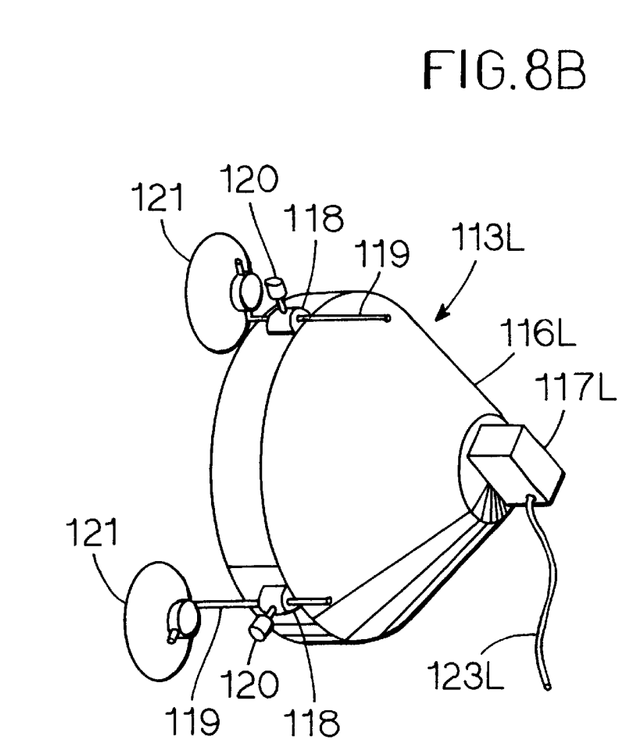
Figure 9:
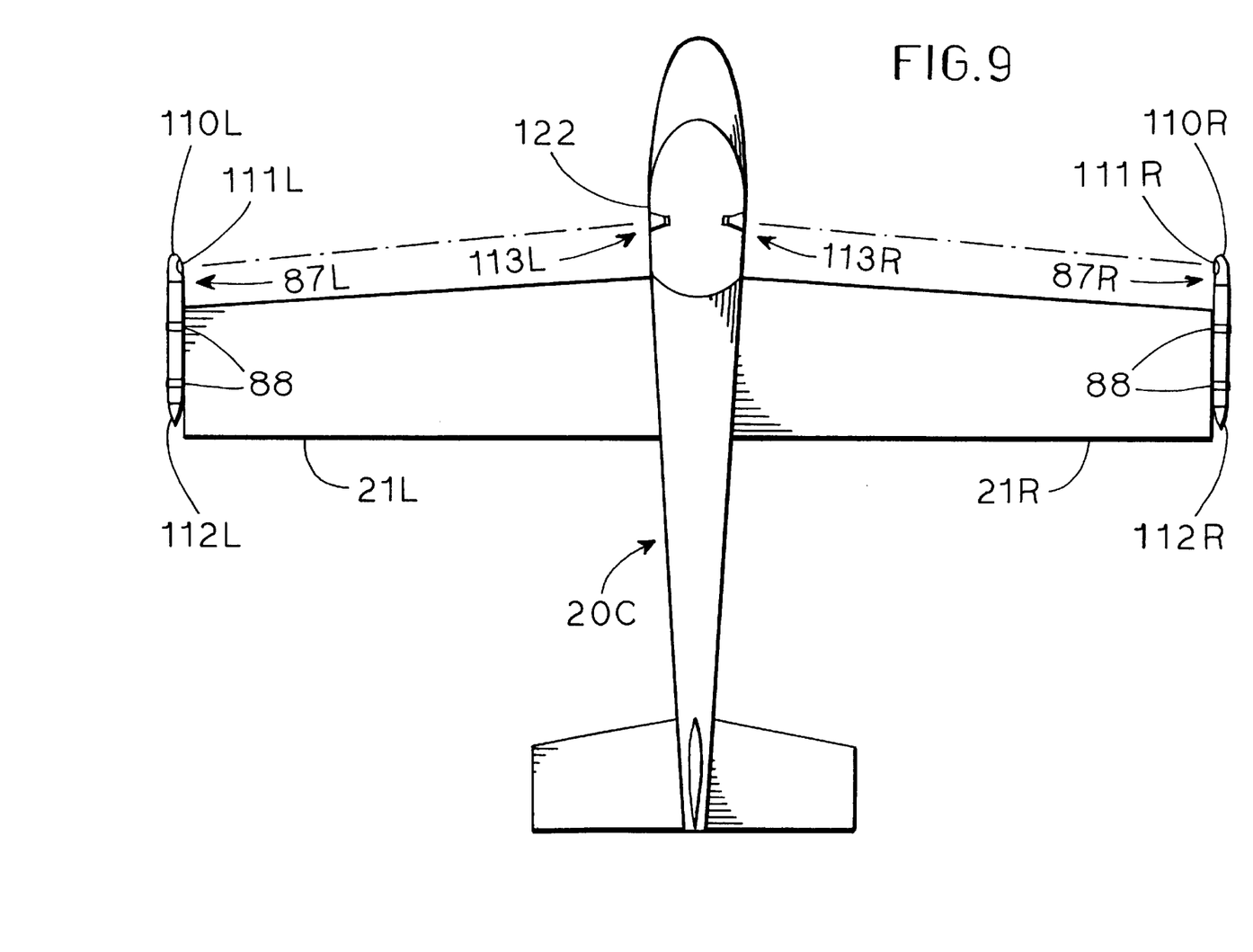
FIG. 9 Top view, not to scale, of a glider equipped with two IR wingtip units and two IR cockpit units seen through a transparent canopy.

Referring to FIG. 8B, three shaft collars 118 are attached equidistantly on the periphery of the large extremity of conical tube 116L. One arm of L-shaped brackets 119 can slide in each collar 118 and be secured to it by thumbscrews 120, and the other arm is attached to elastomeric suction cups 121, as shown. Cockpit unit 113L is affixed by its 3 suction cups to the inside of a transparent window or canopy 122 on the left side of the cockpit, in the general area illuminated by NIRED 102L from the left wingtip unit 87L. Brackets 119 are then adjusted via thumbscrews 120 so that the optical axis of the lens 114L - module 117L of cockpit unit 113L aims at the nose 110L of the left wingtip unit 87L (FIG. 9). Functionally, module 117L of cockpit unit 113L removes the high-frequency carrier (here 40 kHz) of the infrared signal transmitted by NIRED 102L and outputs a TTL signal that mirrors the coded pulses produced by microcontroller 99L in wingtip unit 87L.

All the parts 87L to 117L are duplicated on the right side (not shown) as parts 87R to 117R, as well as the canopy fixtures 118 to 121. Referring to FIG. 8A, the TTL outputs of units 113L and 113R are brought by cables 123L and 123R to a digital microcomputer 124 in the cockpit, through two digital input pins from a parallel or another I/O port. A battery with a voltage regulator (not shown) provides electrical power to modules 117L and 117R through cables 123L and 123R if microcomputer 124 is unable to do so through one of its ports. Microcomputer 124 is connected to a high resolution liquid crystal display monitor 125 in view of the pilot, to an audio loudspeaker 126, and to a diminutive keyboard 127 allowing the pilot to select different programs and interface options in flight.

A first program available to the pilot is a "systems check", generally used prior to take-off. When this program runs, microcomputer 124 monitors the activity on either its left or right input, at the option of the pilot. As long as the long synchronization pulse and the correct number of data pulses generated by the corresponding wingtip unit microcontroller are detected and fall within preset time windows, the program generates a continuous tone in loudspeaker 126. Otherwise, no tone is produced, and appropriate error messages are sent to display 125.

A second program available is a "chart recorder", to be used in flight. In this program, microcomputer 124 waits for a long synchronization pulse on the left input, decodes the following binary number and stores it in Random Access Memory (RAM) in a form of First-In First-Out first array, then does immediately the same for the right input and stores that number in a second array. The synchronicity error between the two measurements is at most of two sampling times, that is here a fraction of a second, and is of no consequence in this application. Both left and right "instantaneous" values are displayed symmetrically by a left and a right dot moving horizontally on top of display 125, as well as their algebraic difference by a third dot in the center. The cycle is repeated and past values scroll down the display as in a three-channel chart recorder (FIG. 8A), at a rate selected by the pilot, so as to have a better feel for the short-term or long-term trends of humidity encountered in flight. All the recent data being available in RAM, the program can easily perform smoothing, auto-centering, auto-scaling, and running average functions with minimal input from the pilot. For example, the display reproduced in FIG. 8A indicates to the pilot that in the time it takes for the data to scroll down the screen, aircraft 20C has grazed an area of relatively lower humidity with the left wingtip (deviation of the left and central traces), and then entered a zone of relatively higher humidity head-on (deviation of the left and right traces, canceling out in the middle trace). Also the program calls the pilot's attention to the display with various sound patterns in loudspeaker 126, such as tones, clicks, or beats. For example, those can be clicks repeated in proportion to a humidity differential on the right side, double clicks repeated in proportion to a humidity differential on the left side, and a whining sound with a pitch in proportion to a simultaneous rise of humidity of both sides.

The output of photodiodes 96L and 96R is essentially a function of the number of water molecules within the volume of narrow tubes 89L and 89R, that is proportional to absolute humidity. The wingtip units of this $3^{rd}$ embodiment are much simpler than true absolute humidity hygrometers such as described by Wilson et al. (1995), as they are designed to measure only relative variations of absolute humidity, not accurate values of the same. The suitability of absolute humidity variations for detecting moist thermals is explained at the end of the description section of the $1^{st}$ embodiment.

Operation of the $3^{rd}$ embodiment of the present invention is as follows. Prior to take-off, the pilot installs and turns on wingtip IR unit 87L on the left wing of aircraft 20C, with NIRED 102L pointing towards the cockpit, as shown in FIG. 9. In the cockpit, with computer 124 running the "systems check" program, the pilot scans the inside of canopy 122 with cockpit IR unit 113L to delineate by ear the perceived on-off boundaries of the illumination area of NIRED 102L. The pilot then plugs units 113L onto canopy 122 in a generally central but unobtrusive location of that area, and adjusts its thumbscrews 120 as described. If aircraft 20C has relatively flexible wings (as fiberglass sailplanes do, for example), the above procedure is followed while a helper lifts the wingtip to a position similar to that adopted in normal flight. The same procedure is followed for installation of units 87R and 113R on the right side (FIG. 9). After take-off, and searching for moist thermals, the pilot selects the "chart recorder" program described above and navigates aircraft 20C in a similar way to that described in the operation section of the $1^{st}$ embodiment.

DESCRIPTION AND OPERATION OF $4^{th}$ EMBODIMENT

The $4^{th}$ embodiment of the invention is based on sensors that change capacitance as a function of humidity, with humidity information being transmitted to the cockpit by radio waves.

Figure 1D:
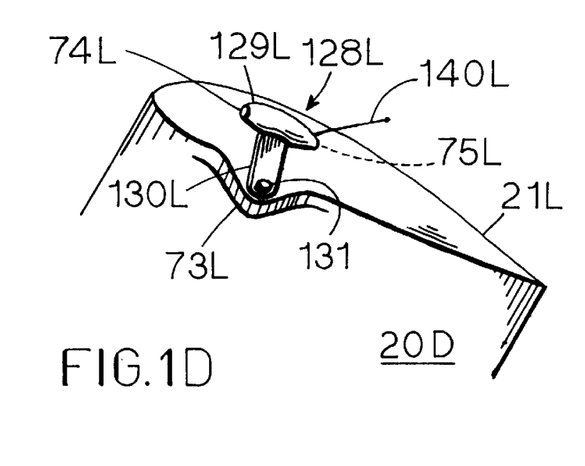

Referring to FIG. 1D, a capacitive hygrometer and radio transmitter (TX) wingtip unit 128L presents itself as an aerodynamically shaped container 129L fixed on a tongue-like support 130L made of rigid and yet bendable material. Unit 128L is attached to the tip of left wing 21L of an aircraft 20D such as a glider by a removable bolt 131, with its washers, nut, and safety wire. Bolt 131 is tightened through a hole in support 130L and through a tie-down hole or a ring as found on glider wingtips or wingtip skids 73L (as shown), so as to hold container 129L within the airflow of normal flight. Tongue 130L is manually bent so as to conform to the particular geometry of the wingtip.

Figure 10A:
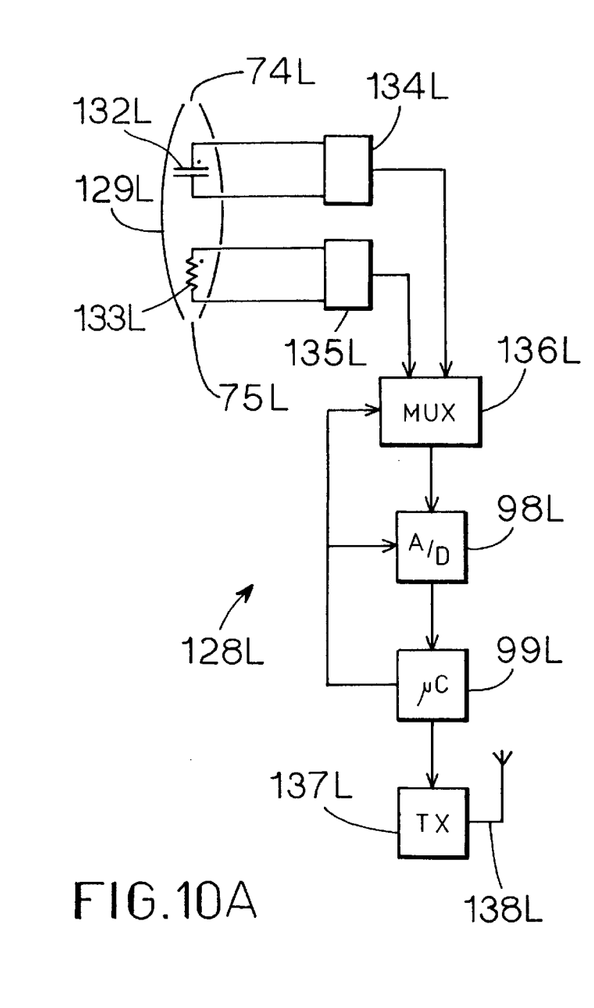
FIG. 10A and 10B Capacitive sensor embodiment; (A) synoptic organization of a left radio wingtip unit, (B) synoptic view of the radio cockpit units, with audio-visual interface.

Referring to FIG. 10A, a capacitive humidity sensor 132L and a resistive temperature sensor 133L such as a thermistor or an RTD are placed in container 129L so as to be exposed to a sampling of ambient air between inlet 74L and outlet 75L during forward motion of the aircraft. Open areas of inlet 74L and outlet 75L are large enough to change the air in container 129L at a rate in accordance with the time constant of the response of capacitive sensor 132L, and small enough to minimize anemometric effects on resistive sensor 133L. Humidity sensor 132L is part of an oscillating circuit 134L with a DC voltage output function of its capacitance, which is generally a function of relative humidity (Panametrics 1997). Temperature sensor 133L is part of an electrical circuit 135L with a DC voltage output function of its resistance, which is generally a function of dry-bulb temperature.

The voltage outputs of circuits 134L and 135L are alternatively tapped by a multiplexor 136L into A/D converter 98L. Digital microcontroller 99L initiates the multiplexing and the A/D conversions several times per second. Resulting binary numbers representing humidity and temperature are temporarily stored in microcontroller 99L, encoded one after the other into a bit stream starting with appropriate synchronization bits, and sent serially to a miniature radio transmitter 137L. Transmitter 137L operates on a UHF band, for example 418.00 MHz, with a throughput of 4800 bit/s (Linx Technologies 1997) and is similar to those used in remote controls of car garage doors. A radio antenna 138L here about 160 mm long broadcasts the combined relative humidity and dry-bulb temperature signal in a radius in excess of 100 m. All the parts just described consist of small low-power electronic components that, except for antenna 138L, fit within container 129L together with a battery and associated wiring (not shown). All the parts of the left wingtip capacitive unit 128L are duplicated in the right unit 128R (not shown), except that the frequency of transmitter 137R is different, for example 433.92 MHz.

Figure 10B:
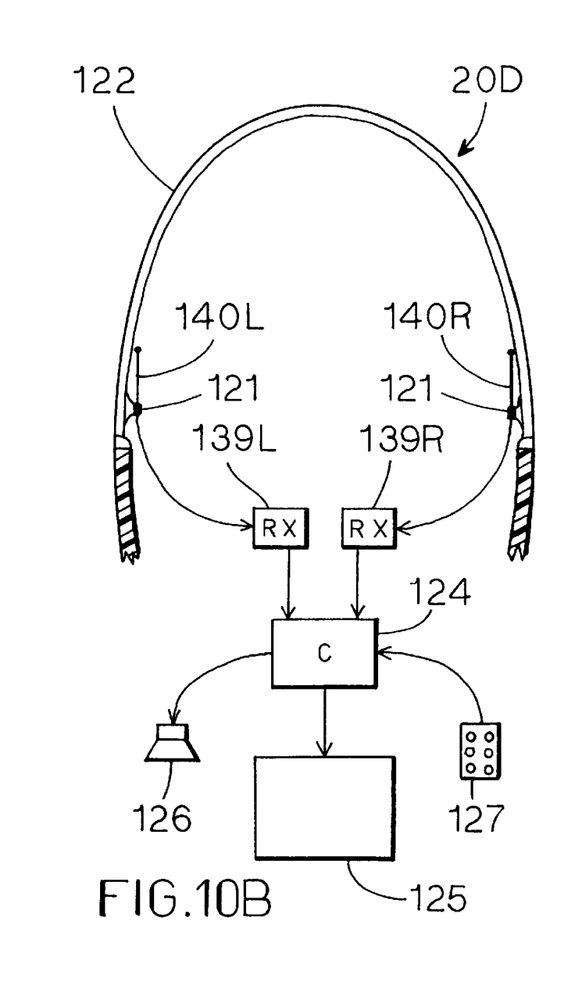

Referring now to FIG. 10B, in a central location of aircraft 20D, a left UHF receiver (RX) 139L with logic data output (Linx Technologies 1997) receives through an antenna 140L the data transmitted by left wingtip unit 128L, and a right receiver 139R receives the right wingtip data through an antenna 140R. In a fuselage opaque to radio waves, antennas 140L and 140R are held by suction cups 121 inside cockpit windows or canopy 122 so as to be in better line of sight with the wingtips. In a manner similar to that of the $3^{rd}$ embodiment, a microcomputer 124 with floating point computing abilities successively monitors the serial data from the left and right receivers 139L and 139R, and upon receiving specific synchronization bits, stores in appropriate left and right RAM arrays the demultiplexed values of relative humidities and dry-bulb temperatures. Microcomputer 124 then calculates, for each side, the standard water vapor saturation pressure as a function of dry-bulb temperature (or from a look-up table), and multiplies this saturation pressure by relative humidity to obtain a water vapor partial pressure value that is independent of temperature. The difference of pressure values between left and right wingtips and their evolution as function of time are processed as in the $3^{rd}$ embodiment, with display 125, loudspeaker 126, and small keyboard 127, and its description will not be duplicated here.

It is noteworthy, however, that in this $4^{th}$ embodiment of the invention, the temperature does not appear as itself on the display; it is only used to calculate a temperature-independent humidity value, the variations of which being the focus of the present invention. Operation of the $4^{th}$ embodiment is practically the same as that of the $3^{rd}$ embodiment and is not repeated here.

CONCLUSION, RAMIFICATIONS, AND SCOPE

Thus the reader will see that the aircraft system of the present invention provides a significant tool to discover and to take advantage of moist thermals, essentially to gain altitude in its associated updrafts. The system is generally portable, and easy to configure for a particular aircraft, as many different sensor, telemetry and interface options are available. The system of the present invention relies only on the variation of some humidity values, and does not necessarily use accurate, calibrated, and complex hygrometers to do so.

While the above descriptions contain many specificities, these should not be construed as limitations on the scope of invention, but rather as just four embodiments thereof. Many other variations are possible, as will be briefly presented.

It will be apparent to a Humidity Sensors Engineer that the hygrometers described can be altered and yet perform the same function as in the present invention. For example, the Wheatstone bridge of the $1^{st}$ embodiment can be adapted to be excited by AC instead of DC, to prevent electrolytic migration in some resistive sensors. Also, the absorption spectrometer of the $3^{rd}$ embodiment can operate on other water absorption bands between the near-infrared and the microwave range, or in the ultraviolet as in a classic Lyman-alpha hygrometer. Furthermore, other types of hygrometers than those described can be used in the system of the present invention, for example fast cryogenic devices, Fabry-Perot fiber optic humidity analyzers, radiosonde equipment, or those mentioned in the Prior Art section.

It will be apparent to an Electronics Engineer that the circuitry and diagrams provided herein can be replaced by many other ones performing the same functions, and that none of the ones described in detail are specifically required for implementing the invention. The telemetry links described can be shuffled between all the embodiments, or other types used, such as fiber optic cables, or different carrier current systems. The data encoding can use any combination of analog, pulse frequency, pulse width, pulse position, and pulse coding modulation and remain within the scope of the invention.

It will be apparent to an Aeronautical Engineer that all the above hygrometer containers can be attached to the wing, not necessarily to the wingtip itself, by other methods than those described, for example on wing "pods" as on weather aircraft, to wing bracing structures or cables, or to lateral landing gear elements. What is referred to as "wing" throughout can be a non-lifting structure, such as a boom or a horizontal stabilizer, for example of an airship. Also, the humidity sensors can be incorporated within wingtip fairings or winglets to reduce drag. The system can be installed in aircraft with automatic pilots. The scope of the invention, however, does not include systems installed in aircraft such as turboprop and jet airplanes that fly too fast to benefit from updrafts, as thermals would then be crossed too quickly for the pilot to be able to take any beneficial action.

It will be apparent to a Glider Pilot that the variations of air humidity can be monitored as the glider is towed up by a plane, so as to allow a preliminary appreciation of the state of the atmosphere prior to searching for thermals. Finally, the humidity data gathered by the system of the present invention can be integrated in a computerized Flight Management System with temperature and barometric data as in a standard meteorological sounding, and furthermore, with vertical axis inertial data from an accelerometer and with the geographical coordinates from a Global Positioning System, so as to generate for the pilot a form of real-time map of actual and probable updrafts.

Accordingly, the scope of the invention should be determined not by the embodiments illustrated, but by the appended claims and legal equivalents.

It is claimed:

1. An aircraft system for use in a slow-flying aircraft selected from the group consisting of gliders, sailplanes, paraplanes, motorgliders, ultralights, low power-to-weight airplanes, and airships, comprising:

a left air humidity sensor mounted as laterally as possible on the port side of said aircraft, a right air humidity sensor mounted as laterally as possible on the starboard side of said aircraft, a left telemetry link carrying data from said left air humidity sensor to a generally central location of said aircraft, a right telemetry link carrying data from said right air humidity sensor to said central location, an electrical circuitry, located at said central location, collecting left and right air humidity data from said left and right telemetry links, respectively, and measuring a lateral air humidity difference between left and right air humidity data, a pilot interface in the cockpit of said aircraft, functionally connected to said electrical circuitry, providing the pilot of said aircraft with an indication of said lateral air humidity difference, whereby the pilot can identify which side of said aircraft is exposed to moister air, and can steer said aircraft towards said moister air in search of thermals, plumes, and bubbles of rising air that may be associated with said moister air.

2. The aircraft system of claim 1, wherein said aircraft possesses relatively elongated wings and wherein said left and right air humidity sensors are affixed in the vicinity of the left and right wingtips, respectively, thereby maximizing the spanwise spatial resolution of said lateral air humidity difference.

3. The aircraft system of claim 1, wherein said left and right air humidity sensors are affixed to said aircraft by easily removable fixtures, thereby helping said aircraft system to be more portable from one aircraft to another.

4. The aircraft system of claim 1, wherein said left and right air humidity sensors are selected from the group consisting of airborne Lyman-alpha hygrometers, airborne chilled-mirror thermoelectric hygrometers, and airborne microwave resonance cavities.

5. The aircraft system of claim 1, wherein said left and right air humidity sensors measure variations of atmospheric moisture by variations of an electrical parameter selected from the group consisting of impedance, resistance, capacitance, voltage, intensity, and frequency.

6. The aircraft system of claim 1, wherein said left and right air humidity sensors measure variations of atmospheric moisture by measuring frequency variations of piezoelectric crystals onto which water molecules are adsorbed in some proportion of humidity.

7. The aircraft system of claim 1, wherein said left and right air humidity sensors measure variations of atmospheric moisture by variations of electromagnetic absorption in the ultraviolet, infrared, or microwave absorption bands for water.

8. The aircraft system of claim 1, further comprising heaters for said left and right air humidity sensors, whereby the influence of variations of ambient temperature on the humidity measurements made by said sensors is minimized.

9. The aircraft system of claim 1, further comprising, respectively, left and right temperature sensors in proximity to said left and right humidity sensors, with data from said temperature sensors also being carried by said left and right telemetry links, and where the temperature data are solely used to calculate and subtract temperature effects from humidity measurements.

10. The aircraft system of claim 1, wherein said left and right telemetry links employ during daytime the preexisting electrical wiring for the position lights of said aircraft.

11. The aircraft system of claim 1, wherein said left and right telemetry links are selected from the group consisting of infrared and radio wireless telemetry links, whereby the system obviates the need for electrical or fiber optic wires for humidity data transmission.

12. The aircraft system of claim 11, wherein each said telemetry link comprises a source of modulated infrared light in close proximity to said humidity sensor on the same side, and an infrared light detector held by suction cups behind a windowed aperture on the same side of the central section of said aircraft.

13. The aircraft system of claim 1, wherein said pilot interface presents said lateral humidity difference visually to the pilot by a lateral humidity indicator selected from the group consisting of panel meters, dot/bargraph displays, matrix screens, and computer monitors.

14. The aircraft system of claim 1, wherein said pilot interface presents said lateral humidity difference aurally to the pilot by sounds selected from the group consisting of pitch variations, clicks and beat patterns, as a function of said difference, in one or two laterally separated loudspeakers.

15. The aircraft system of claim 1, wherein said electrical circuitry further tracks air humidity data differentially over time, thereby over distance as said aircraft flies, whereby said circuitry provides an axial air humidity trend.

16. The aircraft system of claim 15, wherein said pilot interface further presents said axial humidity trend visually to the pilot by an axial humidity indicator selected from the group consisting of panel meters, dot/bargraph displays, matrix screens, and computer monitors.

17. The aircraft system of claim 15, wherein said pilot interface presents said axial humidity trend aurally to the pilot by sounds selected from the group consisting of pitch variations, clicks and beat patterns, as a function of said trend, in one or two loudspeakers separated along the longitudinal axis.

* * * * *